United States Patent
Sato

(10) Patent No.: US 7,524,066 B2
(45) Date of Patent: Apr. 28, 2009

(54) PROJECTION DEVICE PROJECTION SYSTEM, AND IMAGE OBTAINMENT METHOD

(75) Inventor: Kunio Sato, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/534,366

(22) PCT Filed: Dec. 18, 2003

(86) PCT No.: PCT/JP03/16272

§ 371 (c)(1),
(2), (4) Date: May 9, 2005

(87) PCT Pub. No.: WO2004/057565

PCT Pub. Date: Jul. 8, 2004

(65) Prior Publication Data

US 2006/0033884 A1  Feb. 16, 2006

(30) Foreign Application Priority Data

Dec. 20, 2002 (JP) .............................. 2002-369133

(51) Int. Cl.
G03B 21/26 (2006.01)
G03B 21/00 (2006.01)
H04N 5/64 (2006.01)

(52) U.S. Cl. .......................... 353/30; 353/121; 353/122; 348/744

(58) Field of Classification Search ............... 353/30, 353/69, 70, 121, 122, 28; 382/307, 285, 382/294, 254, 275, 312; 600/587; 348/135, 348/195, 744; 356/2, 147; 345/764, 838, 345/581; 715/517; 704/4
See application file for complete search history.

(56) References Cited

U.S. PATENT DOCUMENTS

| | | | | |
|---|---|---|---|---|
| 5,699,460 | A * | 12/1997 | Kopet et al. | 382/307 |
| 5,909,678 | A * | 6/1999 | Bergman et al. | 707/4 |
| 6,333,752 | B1 * | 12/2001 | Hasegawa et al. | 715/764 |
| 6,597,410 | B1 * | 7/2003 | Doany et al. | 348/744 |
| 7,001,024 | B2 * | 2/2006 | Kitaguchi et al. | 353/70 |
| 7,325,190 | B1 * | 1/2008 | Boehmer et al. | 715/224 |
| 7,412,113 | B2 * | 8/2008 | Morichika et al. | 382/289 |
| 2002/0055692 | A1 * | 5/2002 | Tanaka et al. | 600/587 |
| 2008/0285878 | A1 * | 11/2008 | Morichika et al. | 382/254 |

FOREIGN PATENT DOCUMENTS

| | | |
|---|---|---|
| JP | 63-131258 A | 8/1988 |
| JP | 9-80372 A | 3/1997 |
| JP | 9-325413 A | 12/1997 |
| JP | 10-229463 A | 8/1998 |
| JP | 11-038902 A | 2/1999 |
| JP | 11-305335 A | 11/1999 |
| JP | 2001-356405 A | 12/2001 |
| JP | 2002-247614 A | 8/2002 |

OTHER PUBLICATIONS

Machine translation in English of JP 11-305335, Pulication May 11, 1999, 11 pages.*

* cited by examiner

*Primary Examiner*—Melissa J Koval
(74) *Attorney, Agent, or Firm*—Frishauf, Holtz, Goodman & Chick, P.C.

(57) ABSTRACT

A projector (1) includes a template memory (5), the template memory storing beforehand, for example data of template images made of only ruled lines. A displaying unit (6) of the projector (1) projects template images to a screen (S). A digital camera unit (8) carries out imaging of characters, etc., that are written on the screen (S), together with projected template images. A CPU (2) sends data of the image that is carried out imaging, to a PC (100). The PC (100) receives the image data, and stores it to a storing unit (103).

12 Claims, 15 Drawing Sheets

Fig. 3

| MERCHANDISE CATEGORY | | FIRST HALF | | | | | | | LATTER HALF | | | | | | | FIRST HALF | | | | | | | LATTER HALF | | | | | | |
|---|---|---|---|---|---|---|---|---|---|---|---|---|---|---|---|---|---|---|---|---|---|---|---|---|---|---|---|---|---|
| | | K | | | | | | | K | | | | | | | K | | | | | | | K | | | | | | |
| A-A | PARTITION YEN | | | | | | | | | | | | | | | | | | | | | | | | | | | | | |
| | B MATERIAL YEN | | | | | | | | | | | | | | | | | | | | | | | | | | | | | |
| | % | | | | | | | | | | | | | | | | | | | | | | | | | | | | | |
| A-B | PARTITION YEN | | | | | | | | | | | | | | | | | | | | | | | | | | | | | |
| | B MATERIAL YEN | | | | | | | | | | | | | | | | | | | | | | | | | | | | | |
| | % | | | | | | | | | | | | | | | | | | | | | | | | | | | | | |
| A-C | PARTITION YEN | | | | | | | | | | | | | | | | | | | | | | | | | | | | | |
| | B MATERIAL YEN | | | | | | | | | | | | | | | | | | | | | | | | | | | | | |
| | % | | | | | | | | | | | | | | | | | | | | | | | | | | | | | |
| <QUANTITY> | | K | | | | | | | K | | | | | | | K | | | | | | | K | | | | | | |
| <PERFORMANCE> | | BILLION YEN | | | | | | | BILLION YEN | | | | | | | BILLION YEN | | | | | | | BILLION YEN | | | | | | |
| <ADDITION> | | % | | | | | | | % | | | | | | | % | | | | | | | % | | | | | | |

AGENDA:
DATE AND TIME:
PLACE:
ATTENDER:
ABSENTEE:

CONFERENCE NOTE NUMBER

ITEM OF BUSINESS

COMPLEMENT:

| RULED LINE | STARTING POINT | ENDING POINT | WIDTH | COLOR | LINE TYPE |
|---|---|---|---|---|---|
| K1 | x1,y1 | x2,y2 | 1 | 0 | 1 |
| K2 | x1,y1 | x2,y2 | 1 | 0 | 1 |
| K3 | x1,y1 | x2,y2 | 1 | 0 | 1 |
| ⋮ | ⋮ | ⋮ | ⋮ | ⋮ | ⋮ |
| Kn | x1,y1 | x2,y2 | 1 | 0 | 1 |

| CELL | Ks1 | Ks2 | Ks3 | Ks4 | WIDTH | COLOR | LINE TYPE |
|---|---|---|---|---|---|---|---|
| S1 | (x1,y1) (x2,y2) | (x1,y1) (x2,y2) | (x1,y1) (x2,y2) | (x1,y1) (x2,y2) | 1 | 0 | 1 |
| S2 | (x1,y1) (x2,y2) | (x1,y1) (x2,y2) | (x1,y1) (x2,y2) | (x1,y1) (x2,y2) | 1 | 0 | 1 |
| S3 | (x1,y1) (x2,y2) | (x1,y1) (x2,y2) | (x1,y1) (x2,y2) | (x1,y1) (x2,y2) | 1 | 0 | 1 |
| ⋮ | ⋮ | ⋮ | ⋮ | ⋮ | ⋮ | ⋮ | ⋮ |
| Sn | (x1,y1) (x2,y2) | (x1,y1) (x2,y2) | (x1,y1) (x2,y2) | (x1,y1) (x2,y2) | 1 | 0 | 1 |

PROJECTION DEVICE PROJECTION SYSTEM, AND IMAGE OBTAINMENT METHOD

This application is a U.S. National Phase Application under 35 USC 371 of International Application PCT/JP2003/16272 filed Dec. 18, 2003.

TECHNICAL FIELD

The present invention relates to a projection device, a projection system, and an image obtainment method.

BACKGROUND ART

Conventionally, documents stored in personal computers as data, namely, documents made of characters and charts, etc., are projected expanded on a screen by a projector, in a presentation for describing projects and merchandise. There are projectors having a structure of converting to projection light, image information of documents output from the personal computer, as an image signal, using image converters such as liquid crystal and Micro-Mirror Array.

In recent years, due to the miniaturization of projectors, meetings are often carried out using projectors. In that case, by using a white board as a screen for projection, comments and underline can be directly written down on the white board by a marker, and charts can be created on the whiteboard so as organize a discussion. As this kind of projector, a presentation system using a camera installed in the projector is disclosed in Japanese Patent Application No. H11-305335, FIG. 1.

In a case where charts are created on a whiteboard during meetings, the below methods can be thought of.
(1) Ruled lines are drawn by a marker, and characters, etc., in a frame are also written in by a marker, to a whiteboard.
(2) Ruled lines created by a personal computer is projected by a projector, and characters, etc., in a frame are written in by a marker, to a whiteboard.
(3) Ruled lines created by a personal computer is projected by a projector, and characters, etc., in a frame are written in by input operation of the personal computer.

However, with method (1), it takes time to draw the ruled lines. With method (2), it is necessary to start up a special application software to draw the ruled lines using the personal computer. With method (3), a plurality of participants surround the whiteboard and create charts, etc., holding markers, and thus can not participate in the discussion, and workability of directly writing down a chart on the screen becomes low.

The present invention has been made in consideration of the above, and the object of the present invention is to provide a projection device and an image obtainment method that is possible to elevate workability.

DISCLOSURE OF INVENTION

A projection device according to a first aspect of the present invention, projects images on a screen (S), and comprises:
 a projection unit (6) which projects images on the screen based on provided image data;
 storing units (5, 21) which store data for generating template images that have shapes set beforehand, and
 a control unit (2) which obtains data for generating template images (T1, T2, T3) from the storing units (5, 21), provides the generated image data based on the obtained data to said projection unit (6), and projects the template images to said projection unit (6).

By this kind of structure, workability of directly writing down a chart on the screen can be elevated.

A projection system according to a second aspect of the present invention, projects images on a screen (S), and comprises:
 projection devices (1, 51) which project the images on the screen (S);
 an image storing device (100) which stores data of images that are projected to the screen (S); wherein
 the projecting devices (1, 51) comprise:
  a projection unit (6) which projects images based on the provided image data to the screen (S);
  storing units (5, 21) which store data of template images (T1, T2, T3) where the shapes are pre-set;
  an imaging unit (8) which carries out imaging of the screen (S), and
  a sending unit (9) which sends data; and the image storing device (100) comprises:
  a storing unit (103) which stores data of document images that are projected to the screen (S), and
  a control unit (101) which extracts data of the document image from the storing unit (103), sends the extracted image data to the projection devices (1, 51), receives data of image sent from the projection devices (1, 51), and stores data corresponding it to data of the document image to the storing unit (103).

An image obtainment method according to a third aspect of the present invention projects images on a screen, and comprises:
 a step of projecting a template image where a shape is pre-set, to the screen, and
 a step of carrying out imaging of the screen where the template image is projected.

BRIEF DESCRIPTION OF DRAWINGS

FIG. 3 is a diagram showing a line-up template as an example of a template image stored in a template memory of the projector.

FIG. 4 is a diagram showing a conference note proceeding as an example of a template image stored in the same template memory.

FIG. 9A is a diagram showing ruled line data, which is template data that is stored in the memory card of the projector.

FIG. 9B is a diagram showing cell data, which is template data that is stored in the memory card of the projector.

BEST MODE FOR CARRYING OUT THE INVENTION

Figure 1:
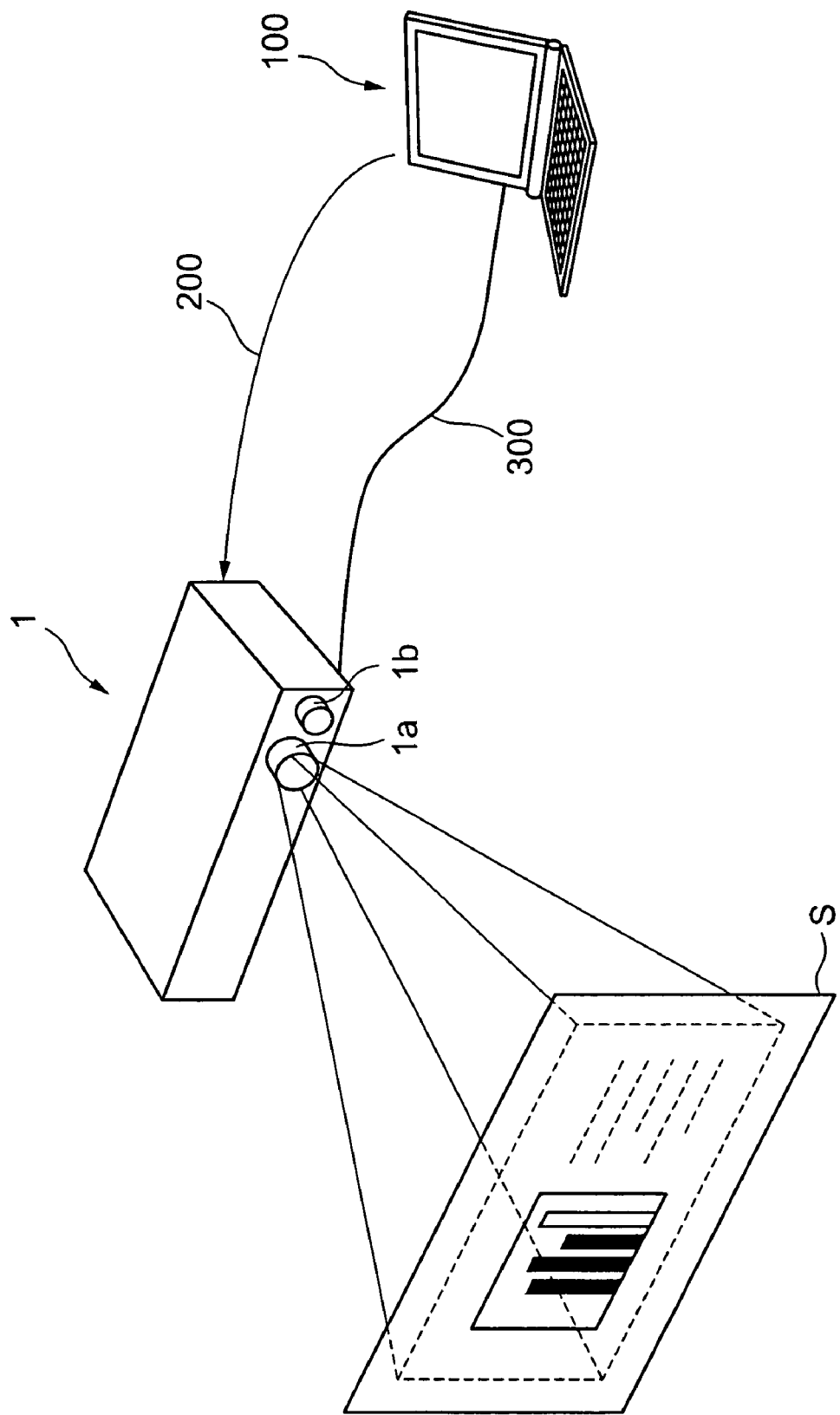
FIG. 1 is a diagram showing a structure of a projection device shown in the first embodiment of the present invention.

Embodiments of the present invention will be described with reference to the drawings.

First Embodiment

The projection system of this embodiment, projects template images, such as images with only ruled lines, on a screen, and reads characters, etc., which are handwritten in the projected template image on the screen, by imaging.

The projection system, comprises a projector 1 and a personal computer (PC) 2, which are connected to each other via an RGB cable 200 and a USB cable 300.

The projector 1 is for projecting images of charts during presentations, etc., and has a built-in digital camera for carrying out imaging of the screen S, such as a white board, etc.

The projector 1 comprises a projection unit 1a, and an imaging unit 1b, at the front side of the body. The projection unit 1a is for projecting display images, and includes optical systems, such as projection lenses for projecting display images. The imaging unit 1b includes optical systems, such as imaging lenses for carrying out imaging of the screen S.

Figure 2:
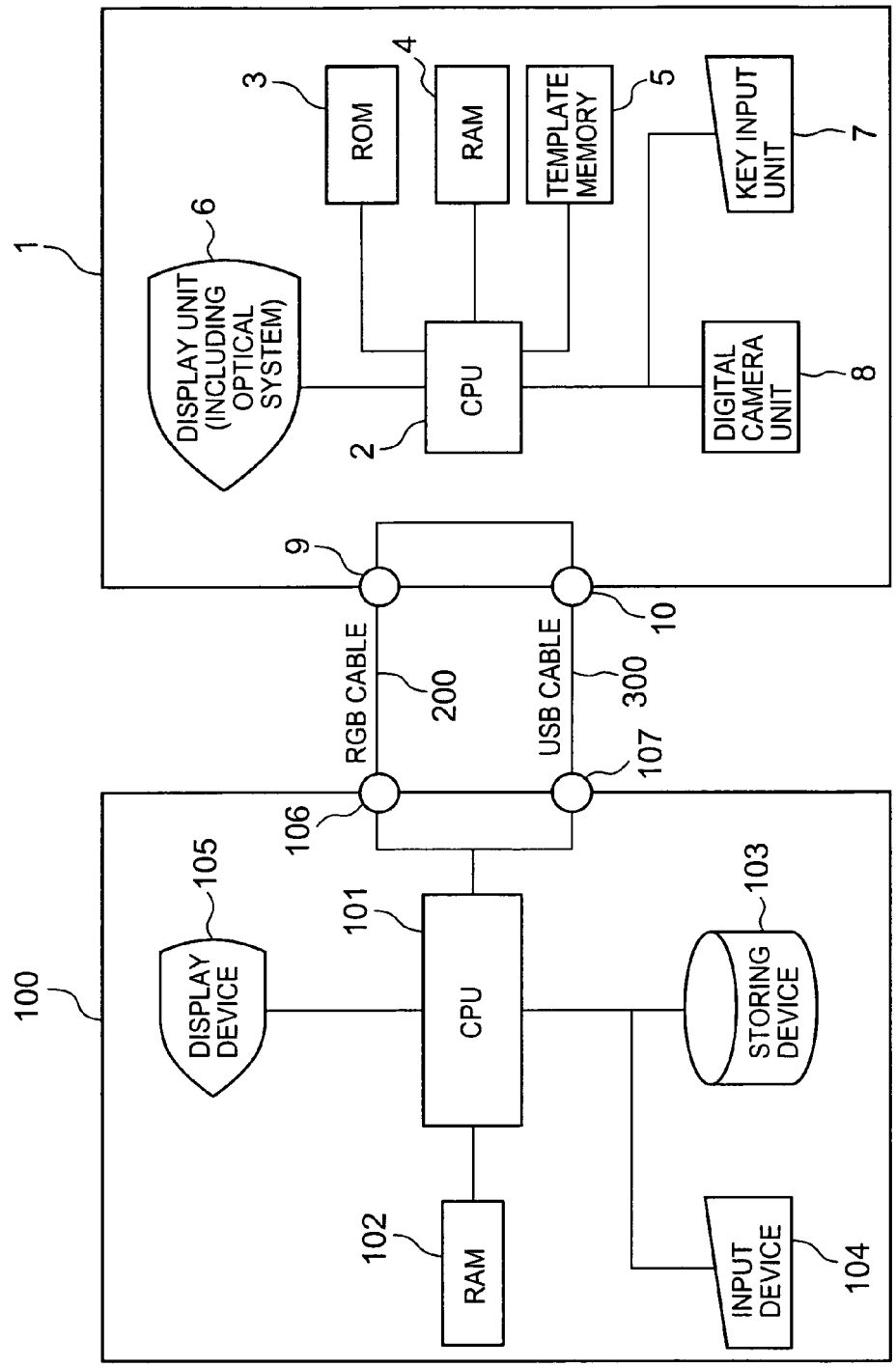
FIG. 2 is a block diagram showing a structure of a projector and a personal computer according to the first embodiment of the present invention.

As shown in FIG. 2, the projector 1 comprises a CPU 2, a ROM 3, a RAM 4, a template memory 5, a display unit 6, a key input unit 7, and a digital camera unit 8.

Figure 5:
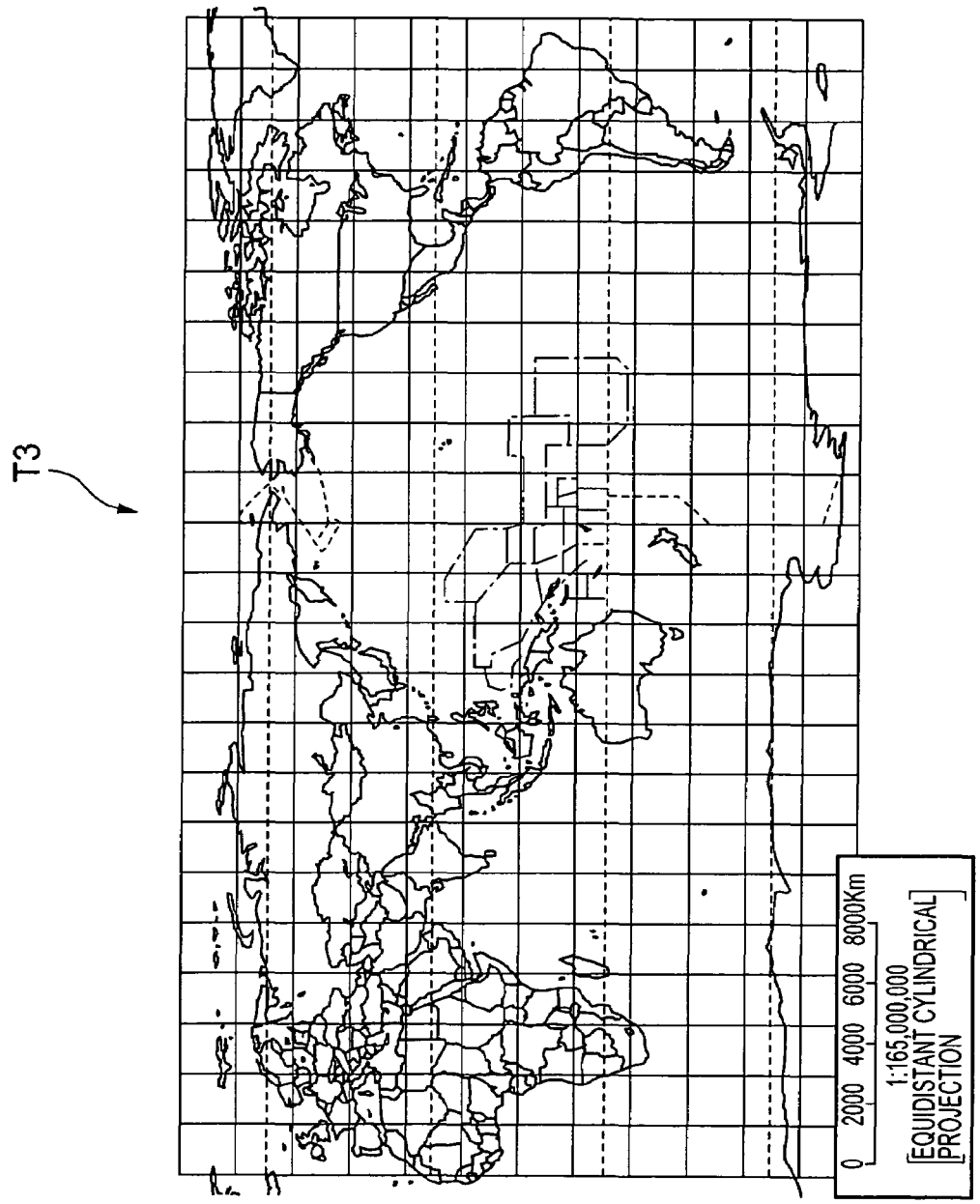
FIG. 5 is a diagram showing a global map template as an example of a template image stored in the same template memory.

The template memory 5 is for storing data for generating template images. Template images are images, where the shape is pre-set. The template memory 5 stores various data for generating template images, such as a lineup template T1 shown in FIG. 3, a conference note proceeding template T2 shown in FIG. 4, and a global map template T3 shown in FIG. 5.

The display unit 6 is for projecting document images of documents (documents having characters and charts, etc.) that are output from the PC 2, and template images, on the screen S. The display unit 6 includes a light source, image converters, a drive circuit, and an optical system (Not shown).

The light source emits light, such as a krypton light. The image converters are for converting the light of the light source to a projection light, and comprises liquid crystal elements and Micro-Mirror Array, etc.

The drive circuit activates the image converters, in response to RBG signals input from an input terminal 18.

The optical systems include imaging lenses, etc., at the projection unit 1a.

The key input unit 7 comprises an operation button for displaying template images, and an operation button for stopping the display of the template images. The key input unit 7 comprises an imaging button for carrying out imaging of the screen S as an object, by the digital camera unit 8. The key input unit 7 sends operation information to the CPU 2, when these buttons are pressed by the user.

The key input unit 7 comprises an operation button, etc., for designating attributes.

The digital camera unit 8 carries out imaging of the screen S as the object, by the imaging button of a key input unit 15 being pressed. A digital camera unit 16 comprises an optical system, an image pickup device, and an image data signal compression processing circuit (Not shown). The optical system includes imaging lenses, etc., at the imaging unit 1b. The image pickup device is for photoelectrical transferring an optical image focused by the optical system to an image signal, and comprises a CMOS sensor and a CCD, etc. The image data signal compression processing circuit compresses digital signals that are digitalized, being output from the image pickup device.

The ROM 3 stores programs. The CPU 2 controls each above described unit that describe the RAM 4 as an operation memory, in accordance with the program stored in the ROM 3. Concretely, the CPU 2 controls the display unit 6 to project the document image on the screen S. When operation information indicating that the operation button for displaying the template is pressed, is sent from the key input unit 7, the CPU 2 receives this operation information from the key input unit 7 as a projection instruction, and projects the template image on the screen S. When operation information indicating that the imaging button is pressed, is sent from the key input unit 7, the CPU 2 receives the operation information as imaging instructions, and controls the digital camera unit 8 to carry out imaging of the screen 8, in accordance with the operation information. By this, the CPU 2 obtains an image that includes recorded information recorded in the documents and the screen S, and outputs the obtained image to the PC 100.

The projector 1 comprises an image input terminal 9, and a USB terminal 10.

The RGB cable 3 is connected to the image input terminal 9. The image input terminal 9 is a terminal for being provided the RBG signal from the PC 100, and is provided at an input image processing circuit, which is not shown. The input image processing circuit includes an A/D converter, etc.

The USB cable 300 is connected to the USB terminal 10. The USB terminal 10 is for sending image data obtained by the projector 1 carrying out imaging, and is provided at a communication interface circuit for USB, not shown in the drawings, which is connected to the CPU 2.

The PC 100 provides data of documents that are to be projected to the screen S, to the projector 1, and comprises a CPU 101, a RAM 102, a storing device 103, an input device 104, and a display device 105.

The input device 104 comprises a plurality of keys, and a mouse, etc., which is connected to the body. When the user operates the input device 104, he input device 104 sends operation information indicating the operation content of the user, to the CPU 101.

The display device 105 displays document images read from the storing device, and displays images sent from the projector 1, and comprises a LCD, and the drive circuit, etc., thereof.

The storing device 103 comprises a hard disk, etc, having a relatively large storage capacity, and stores a presentation program for creating and editing documents for presentation. The storing device 103 stores data of documents made up of characters and charts, for projecting to the screen S, as a document file.

The CPU 101 controls each part of the PC 100, in accordance with the program stored in the storing device 103. The CPU 101 uses the RAM 102 as an operation memory. When the operation information indicating that data of a document is to be sent, is sent from the input device 104, the CPU 101 sends data of the document to the projector 1. When the image data is sent from the projector 1, the CPU 101 stores correlating the image data sent from the projector 1, and sent document data, at the storing unit 103.

The PC 100 comprises an output terminal 106 for RBG signals, and a USB terminal 107. The RGB cable 200 is connected to the output terminal 106. The output terminal 106 is provided at the image signal processing circuit, not shown in the drawings, which is connected to the CPU 101. The USB cable 300 is connected to the USB terminal 107. The USB terminal 107 is provided at the communication interface circuit for USB, not shown in the drawings, which is connected to the CPU 101.

Next, operation of the projection system according to the present embodiment will be described with reference to the flowchart shown in FIG. 6.

First, operations of the PC 100 will be described.

When the user designates data of a document operating the input device 104, the input device 104 of the PC 100 sends the operation information of the user to the CPU 101.

The PC 100 reads data of documents designated by the user, from the storing device 103, and displays a document image of a predetermined page to the display device 105, in accordance with the operation information of the user,. The PC 100 outputs data of the document image displayed to the display device 104, via the RGB cable 200, to the projector 1 (Step SA1).

The PC 100 determines whether the image data is sent from the projector 1 or not (Step SA2). The PC 100 constantly executes the determination by interrupt handling.

In a case where it is determined that the image data is not sent from the projector 1, (Step SA2: YES), the PC 100 displays an image based on the image data sent from the projector 1, to the display device 105. The PC 100 stores the image data sent from the projector 1, correlating it with data of the document image, to the storing device 103 (Step SA3).

Next, the operation of the projector 1 will be described.

The projector 1 projects document images on the screen S, based on data of the document image output from the PC 100 (Step SB1).

The projector 1 determines whether the user operated the operation button for template display, based on the operation information from the key input unit 7 (Step SB2).

In a case where it is determined that the operation button for template display is not operated by the user (Step SB2: NO), the projector 1 continuously projects document images on the screen S (STEP SB1).

In a case where it is determined that the operation button for template display is operated by the user (STEP SB2: YES), the projector 1 receives the operation information as a projection instruction, and reads data of the template image that correspond to the operated button, from the template memory 5 (Step SB3).

The projector 1 switches the projection image from the document image to the template image based on the read data, and projects the template image to the screen S (STEP SB4).

The projector 1 determines whether imaging operation is carried out by the user, based on the operation information from the key input unit 7 (Step SB5).

In a case where the imaging button of the key input unit 7 is not pressed, the projector 1 determines that imaging operation has not been carried out (Step SB5: NO). In this case, the projector 1 determines whether imaging of template image has completed or not, based on the operation information from the key input unit 7 (Step SB8).

In a case where the operation button for stopping the template display is not pressed, the projector 1 determines that imaging of the template image has not been completed (Step SB8: NO). In this case, the projector 1 re-determines whether imaging operation is carried out or not (Step SB5).

Here, if the imaging button of the key input unit 7 is pressed, the projector 1 determines that imaging operation is carried out (Step SB5: YES). In this case, the projector 1 receives the operation information as an imaging instruction, controls the digital camera unit 8, and carries out imaging of the screen S where the template image is projected (Step B6).

The projector 1 outputs the image data obtained by carrying out imaging, to the PC 100, via the USB cable 300 (Step SB7).

The projector 1 re-determines whether imaging of the template image is completed or not (Step SB8), and in a case where it is determined that imaging of the template image has not been completed (Step SB8: NO), the processing of Steps SB5 to SB7 are repeatedly carried out. In this way, the projector 1 outputs image data to the PC 100 each time imaging operation is carried out.

In a case where the operation button for stopping the template display is pressed, the projector 1 determines that imaging of the template image is completed (Step SB8: YES). In this case, the projector 1 switches the image from the template image to the original document image, and projects the document image on the screen S (Step SB9).

This operation will be described more concretely.

In a case where a plurality of participants carry out a meeting, etc., surrounding the screen S, the participants press the operation button that the key input unit 7 of the projector 1 comprises, when a conference note proceeding template T2, such as shown in FIG. 4 is to be used. When the operation button for displaying the conference note proceeding template T2 is pressed, the projector 1 responds to the operation information, and reads data of the conference note proceeding template T2 shown in FIG. 4, from the template memory 5 (Process of Step SB2, SB3 in FIG. 6). The projector 1 projects this image on the screen S, instead of the projected document image (Process of SB4 in FIG. 6).

Next, after the participants record characters on the screen 2 with a marker, the imaging button of the key input unit 7 of the projector 1 is pressed. The projector 1 carries out imaging of the screen S, and sends the image data to the PC 100, in response to the imaging button being pressed (Process of Step SB5 to SB8 in FIG. 6).

Figure 6:
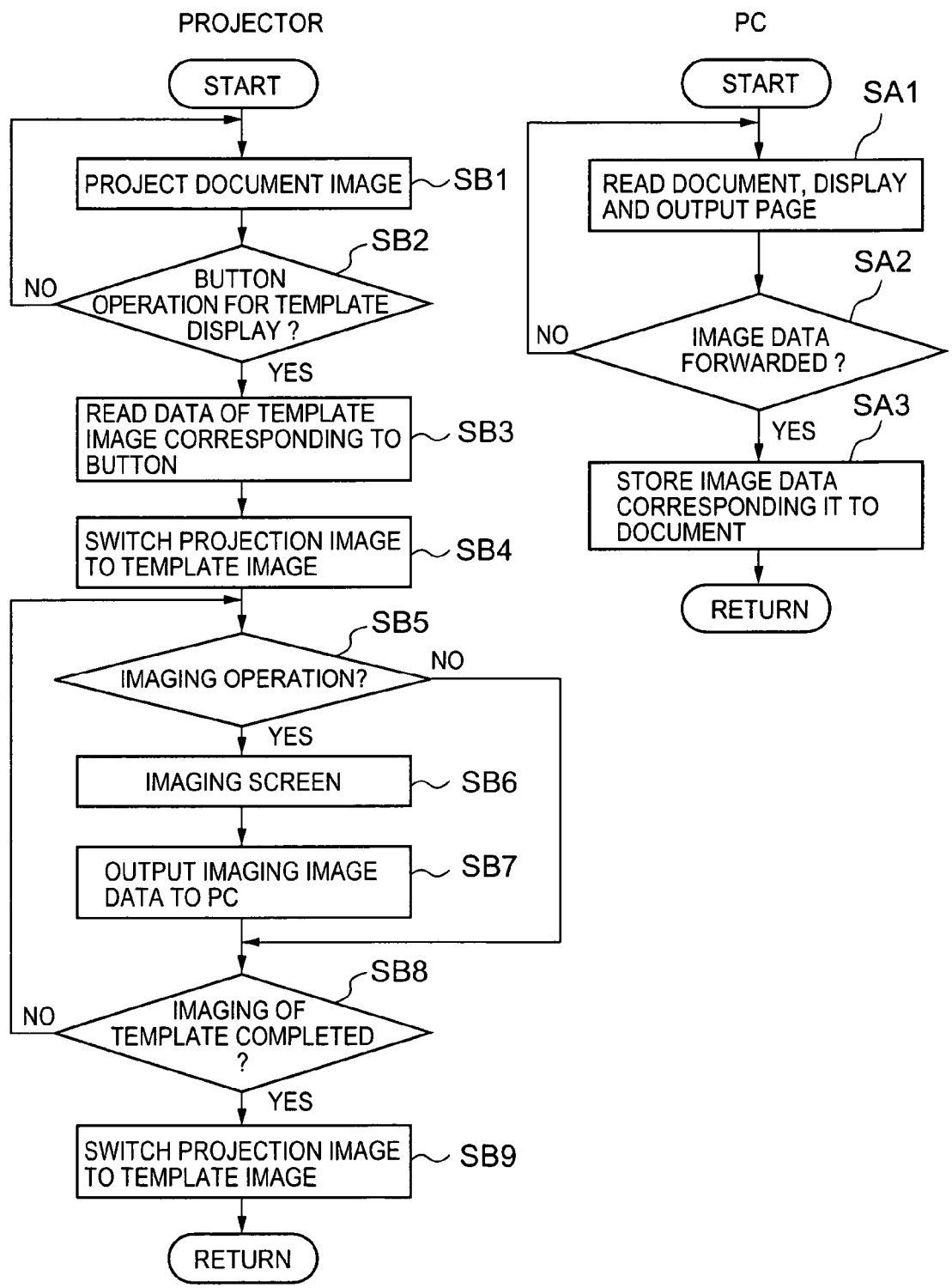
FIG. 6 is a flowchart showing operation of the projector in the first embodiment of the present invention.

When the operation button for stopping the display of the template image is pressed, the projector 1 projects the original document image on the screen S, instead of the template image, in response (Process of Step SB9 in FIG. 6).

The PC 100 stores image data sent from the projector 1, correlating it with the document, at the storing device 103 (Process of Step SA3).

In a case where the PC 100 stores image data that is sent from the projector 1, at the storing device 103 (Step SA3), the PC 100 is structured so that it can identify which image data corresponds to which document data. For example, the PC 100 stores image data sent from the projector 1 in an image file. The PC 100 gives a part of the name of the data file of the document, to the file name of this image file, and stores the image file in the storing device 103.

In a case where image data concerning the same document is sent a plurality of times, the PC 100 puts branch numbers, such as "−1", and "−2" at the end of the file name.

As described above, in the first embodiment of the present invention, for example, a template image such as an image with only ruled lines, is projected to a screen S, and characters, etc. that are handwritten to the screen S, using the projected template image, is obtained by carrying out imaging.

Therefore, it is not necessary for the user to write ruled lines by a marker on the screen S (whiteboard) to make charts, etc., and time necessary to create charts can be saved. A plurality of participants can surround the screen S (whiteboard), and participate in a discussion, holding markers. As a result, work of creating a chart by directly writing down on the screen S, can be improved.

It is not necessary to start a special application software by the PC 100, and template images can be projected immediately.

Furthermore, if a plurality of kinds of template images are pre-stored as image data, various template images can be projected, in accordance with a variety of uses, and usability will improve.

Because images obtained by projecting handwritten characters, etc., on he screen S, are stored in the storing device 103, handwritten information written on the screen S, can be used afterwards.

In the present embodiment, because image data obtained by imaging, is stored correlated with documents, handwritten information can be easily used.

Second Embodiment

Next, the second embodiment of present invention will be described. A projection system according to the second embodiment of the present invention is structured so that template images can be edited.

Figure 7:
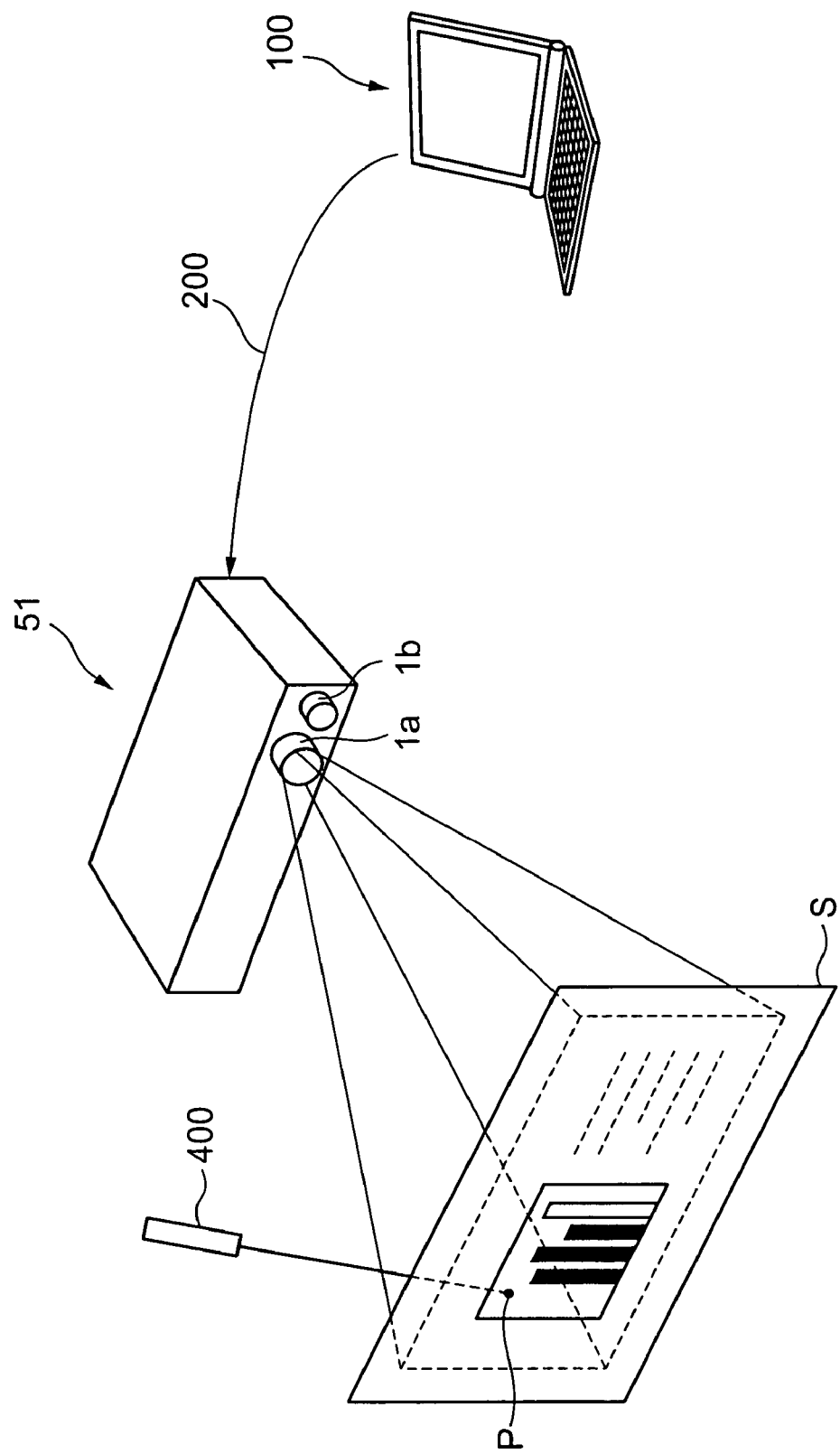
FIG. 7 is a diagram showing a structure of a projection device shown in the second embodiment of the present invention.

As shown in FIG. 7, the projection system according to the second embodiment of the present invention comprises a projector 51, a PC 100, and a laser pointer 400. The laser pointer 400 radiates a spot light P, and is for indicating a position on the screen S, by radiating the spot light P on the screen S. The laser pointer 400 is used for designating an editing position of the template image projected on the screen S.

In the second embodiment, the template images are not stored in the template memory 5, but pre-stored in a memory card. The projection system obtains template images from the memory card.

Figure 8:
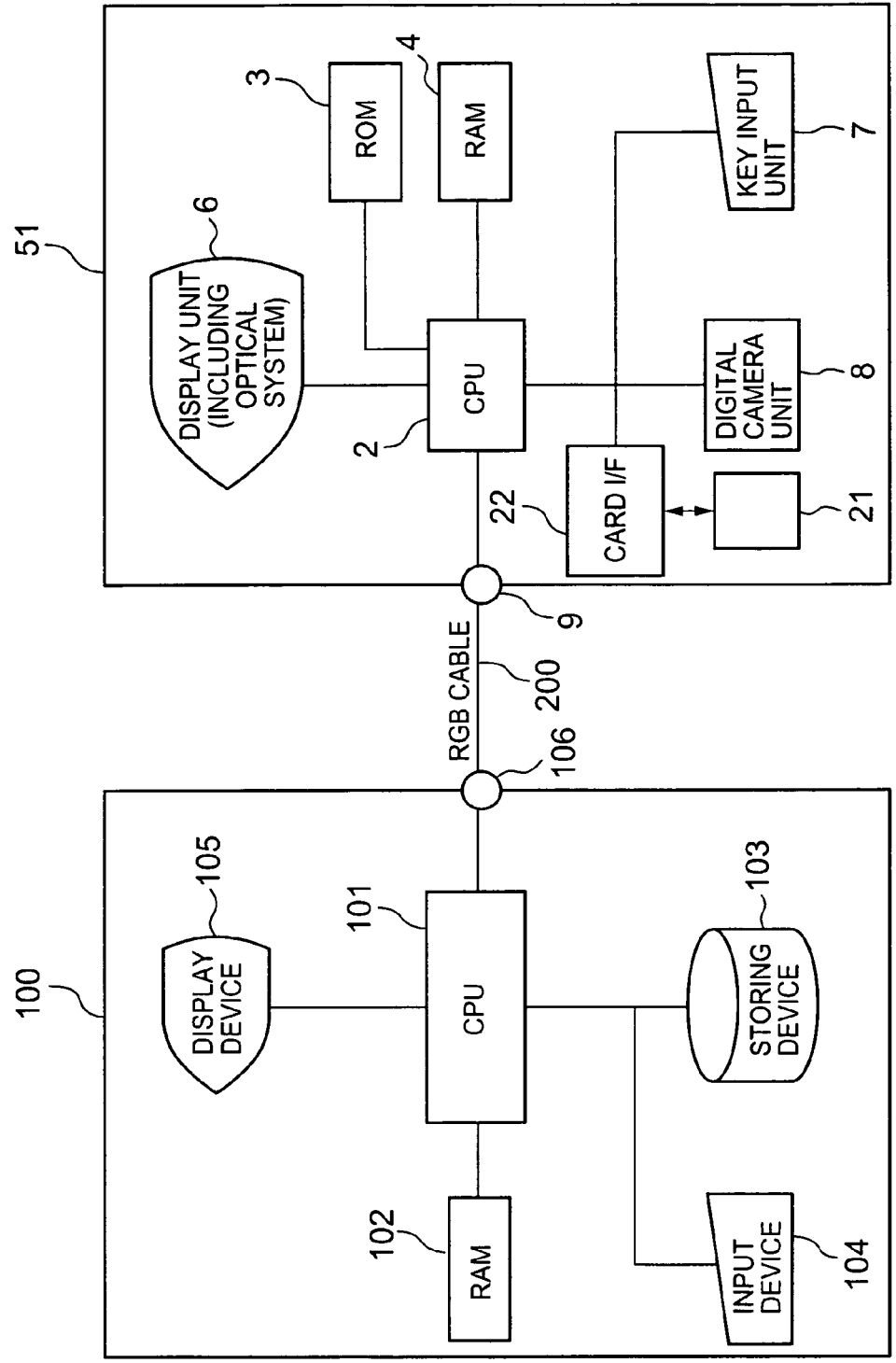
FIG. 8 is a block diagram showing a structure of a projector and a personal computer according to the second embodiment of the present invention.

As shown in FIG. 8, the projector 51 comprises a throttle (not shown in the drawings), and a card interface circuit (card I/F) 22. The throttle is for loading the memory card 21. The card I/F 22 is for inputting and outputting data between the memory card 21.

The projector 51 and the PC 100 are connected to each other only via the RGB cable 200. In the second embodiment, the USB terminal 10 and the communication interface circuit is omitted.

The memory card 21 stores a plurality of template data. The template data is for generating template images, and includes ruled line data 21a, and cell data 21b. The ruled line data 21a is for generating ruled lines, and as shown in FIG. 9A, comprises coordinate data, line width data, color data, and line type data.

The coordinate data indicates a start point and an endpoint of a plurality of longitudinal ruled lines and horizontal ruled lines, in accordance with the number of rows and number of columns. For example, the start point and the endpoint of ruled line K1, shown in FIG. 9A, is respectively expressed by coordinate data (x1, y1), (x2, y2). The coordinate data is expressed by the number of pixels of the display unit 6 of the projector. For example, if the maximum pixel of the horizontal direction and the longitudinal direction is 800×600, the maximum value of the coordinate data showing the start point and he endpoint of the ruled line is (800,600).

The cell data 21b is for generating cells, and as shown in FIG. 9B, comprises coordinate data, line width data, color data, and line type data.

The coordinate data shows the start point and the endpoint of the right to left, up and down ruled lines (Ks1 to Ks4), that form each frame (S1 to Sn) of the coordinate data. For example, the cell S1 is formed by ruled lines Ks1 to Ks4, and the start point and endpoint of ruled line Ks1 can be expressed by the coordinate data (x1, y1), (x2, y2). In the same way as the coordinate data of the ruled line data 21a, the coordinate data of the cell data 21b is expressed in the number of pixels of the display unit of the projector 51.

The line width data shows the width of the ruled line that forms the cell. The color data shows the color inside of the cell. The line type data shows the type of ruled line that forms the cell.

The key input unit 7 comprises various operation buttons. Various functions, such as selection function of template, display function, function for starting editing, and function for giving instructions for editing content, etc., are allotted to the operation buttons.

The CPU 2 obtains information of a editing place that the laser pointer 400 indicates, and specifies data corresponding to the editing place, based on the obtained information of the editing place. The CPU 2 obtains the specified data from the memory card 21, and edits the specified data, based on the operation information from the key input unit 7, which indicates the editing content.

Next, operation of the projection system, according to the present embodiment, will be described.

Figure 10:
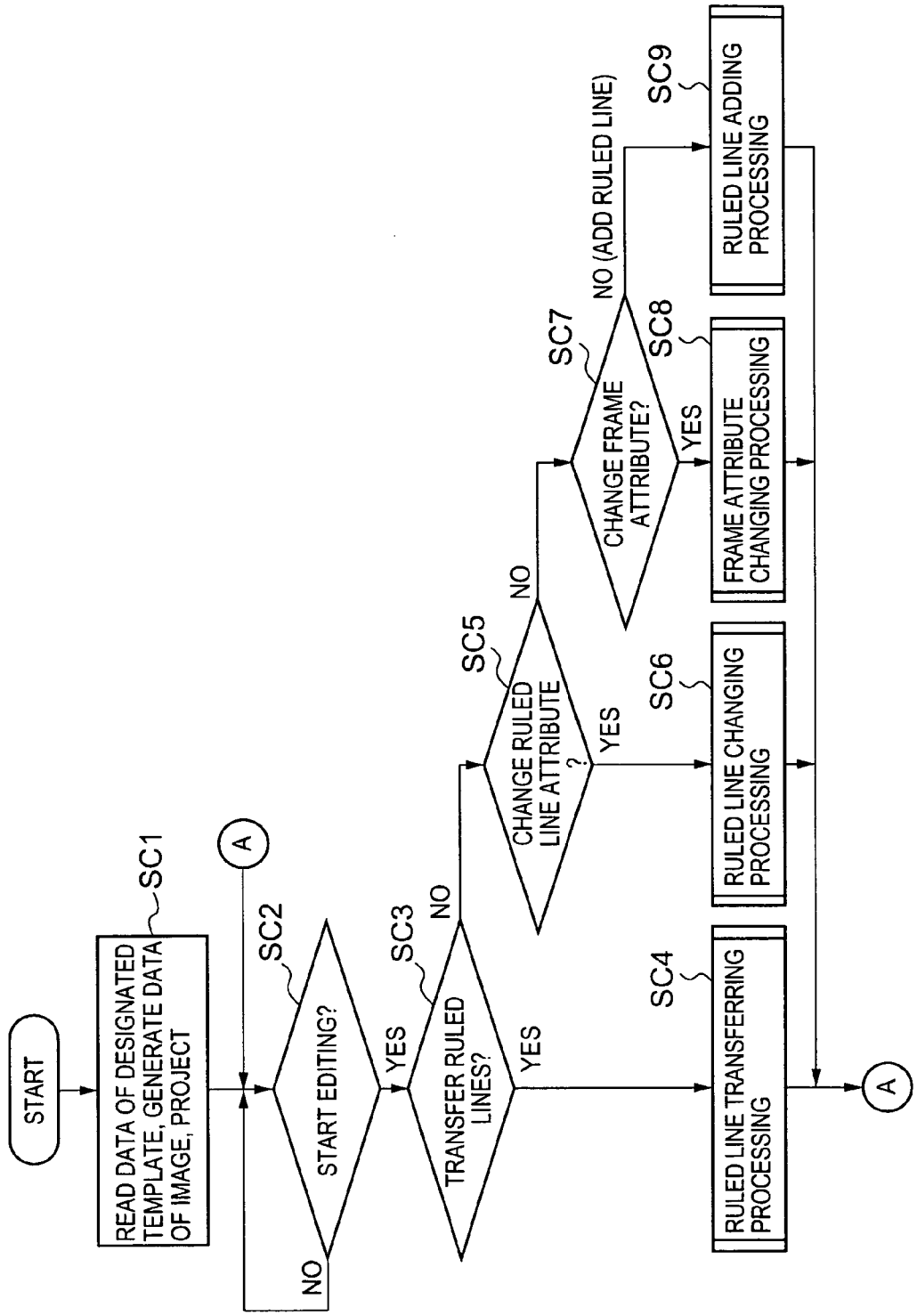
FIG. 10 is a flowchart showing operation of the projector shown in the second embodiment of the present invention.

When the user operates the operation button of the key input unit 7, for displaying a template, while projecting a document, the projector 51 operates in accordance with the flowchart shown in FIG. 10, in response to the operation.

When the operation button for template selection is pressed, the CPU 2 of the projector 51 obtains this operation information from the key input unit 7, and reads the template data of the selected template image from the card memory 21, based on the obtained operation information. The CPU 2 controls the display unit 6 to project the template image on the screen S (Step SC1).

Concretely, when the CPU 2 reads template data from the card memory 21, the CPU 2 develops in RAM 4, image data of the template, based on the read template data.

As described above, the template data comprises ruled line data 21a, and cell data 21b, such as shown in FIG. 9A, and FIG. 9B. The CPU 2 displays ruled line K1 from (x1, y1) to (x2, y2), based on the coordinate data of ruled line data 21a. In the same way, the CPU 2 displays ruled lines K2 to Kn, based on the coordinate data of the ruled line data 21a. In this way, image data of the template is developed in RAM 4, and data of the template image is generated.

The CPU provides data of the generated template image to the display unit 6. The display unit 6 projects the provided template image to the screen S.

Next, the CPU 2 determines whether to start editing or not, based on the operation information from the key input unit 7 (Step SC2).

In a case where the operation button for starting editing is not pressed, the CPU 2 determines that editing is not to start (Step SC2: NO). In this case, the CPU 2 waits until the operation button for starting editing is pressed.

In a case where the operation button for stating editing is pressed, the CPU 2 determines that editing is to be started (Step SC2: YES), and determines the editing content, based on the operation information from the key input unit 7.

First, the CPU 2 determines whether the editing is ruled line transferring, or not (Step SC3). Ruled line transferring processing is for transferring a ruled line to a designated direction for a designated amount.

When the operation button for "ruled line transferring" is pressed, the CPU 2 determines that the editing content is ruled line transferring (Step SC3 YES). In this case, the CPU 2 carries out ruled line transferring processing, according to a flowchart, which will be later described (Step SC4).

After the ruled line transferring processing is completed, the CPU 2 re-determines whether to start editing or not (Step SC2).

If the operation button for "ruled line transferring" is not pressed, after it is determined to start editing, the CPU 2 determines that the editing content is not ruled line transferring (Step SC5). Ruled line attribute changing processing is for changing the attribute of a ruled line, such as width of line, color, and line type.

When the operation button for "ruled line attribute changing" is pressed, the CPU 2 determines that the editing content is ruled line attribute changing (Step SC5: YES). In this case, the CPU 2 carries out ruled line attribute changing processing, according to a flowchart, which will be later described (Step SC6).

After the ruled line attribute changing processing is completed, the CPU 2 re-determines whether to start editing or not (Step SC2).

If the operation button for "ruled line attribute changing" is not pressed, after it is determined to start editing, the CPU 2 determines that the editing content is not ruled line attribute changing (Step SC5: NO). In this case, the CPU 2 determines whether the editing content is frame attribute changing or not (Step SC7). Frame attribute changing processing is for changing ruled line width that form the frame (cell), and coloring in the frame.

When the operation button for "frame attribute changing" is pressed, the CPU 2 determines that the editing content is frame attribute changing (Step SC7: YES). In this case, the CPU 2 carries out frame attribute changing processing, according to a flowchart, which will be later described (Step SC8).

After the frame attribute changing processing is completed, the CPU 2 re-determines whether to start editing or not (Step SC2).

If the operation button for "frame attribute changing" is not pressed, the CPU2 determines that the editing content is not frame attribute changing (Step SC7: NO). In this case, the CPU 2 determines that the editing content is ruled line adding, and carries out ruled line adding processing, according to a flowchart, which will be later described (Step SC9). Ruled line adding processing is for adding ruled lines.

After carrying out these processing, the CPU 2 ends display processing of the template image, when the operation button for ending display of the template image is pressed.

Next, ruled line transferring processing carried out by the projector 51, in Step SC4 of FIG. 10, will be described, based on the flowchart shown in FIG. 11.

The CPU 2 determines whether the operation button for starting editing is pressed or not, based on the operation information from the key input unit 7 (Step SD1).

In a case where it is determined that the operation button for starting editing is not pressed (Step SD1: NO), the CPU 2 waits until the operation button for starting editing is pressed.

Figure 12:
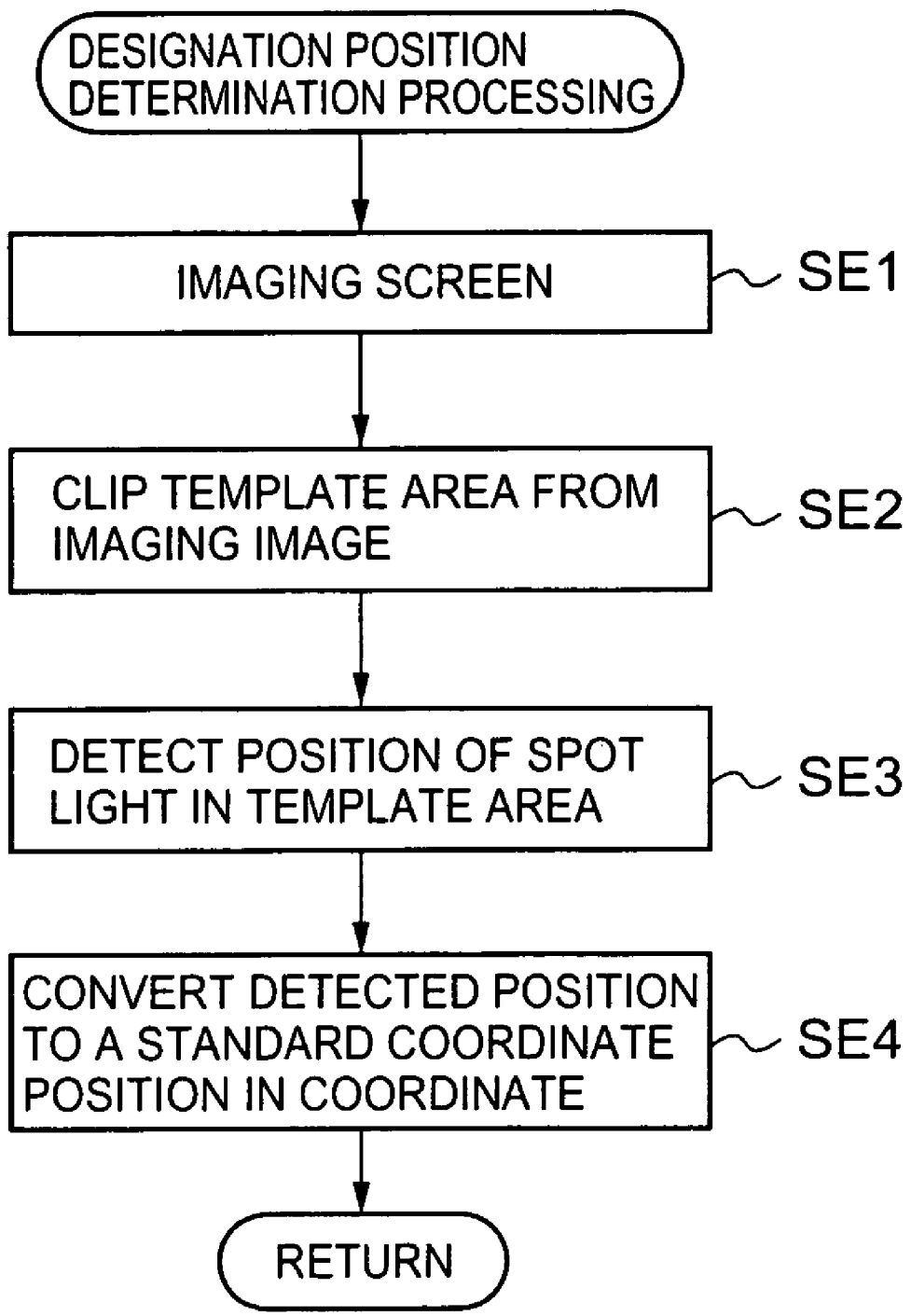
FIG. 12 is a flowchart showing content of designation position determination processing by the projector.

In a case where it is determined that the operation button for starting editing is pressed (Step SD1: YES), the CPU 2 carries out designation position determining processing, according to the flowchart shown in FIG. 12 (Step SD2).

First, the digital camera unit 8 is controlled by the CPU 2, and projects the screen S (Step SE1). A template image is projected on the screen S.

The CPU 2 clips a target projection area of a template image, from the image obtained by carrying out imaging by the digital camera unit 8 (Step SE2).

The CPU2 corrects trapezoid deformation of the clipped projection area of the image, and detects the part that has the most brightness in the corrected image area, as a radiation position of a spot light P (Step SE3).

When the radiation position of the spot light P is determined, the CPU 2 converts the radiation position of the spot light P to coordinate data for template data (Step SE4).

Figure 11:
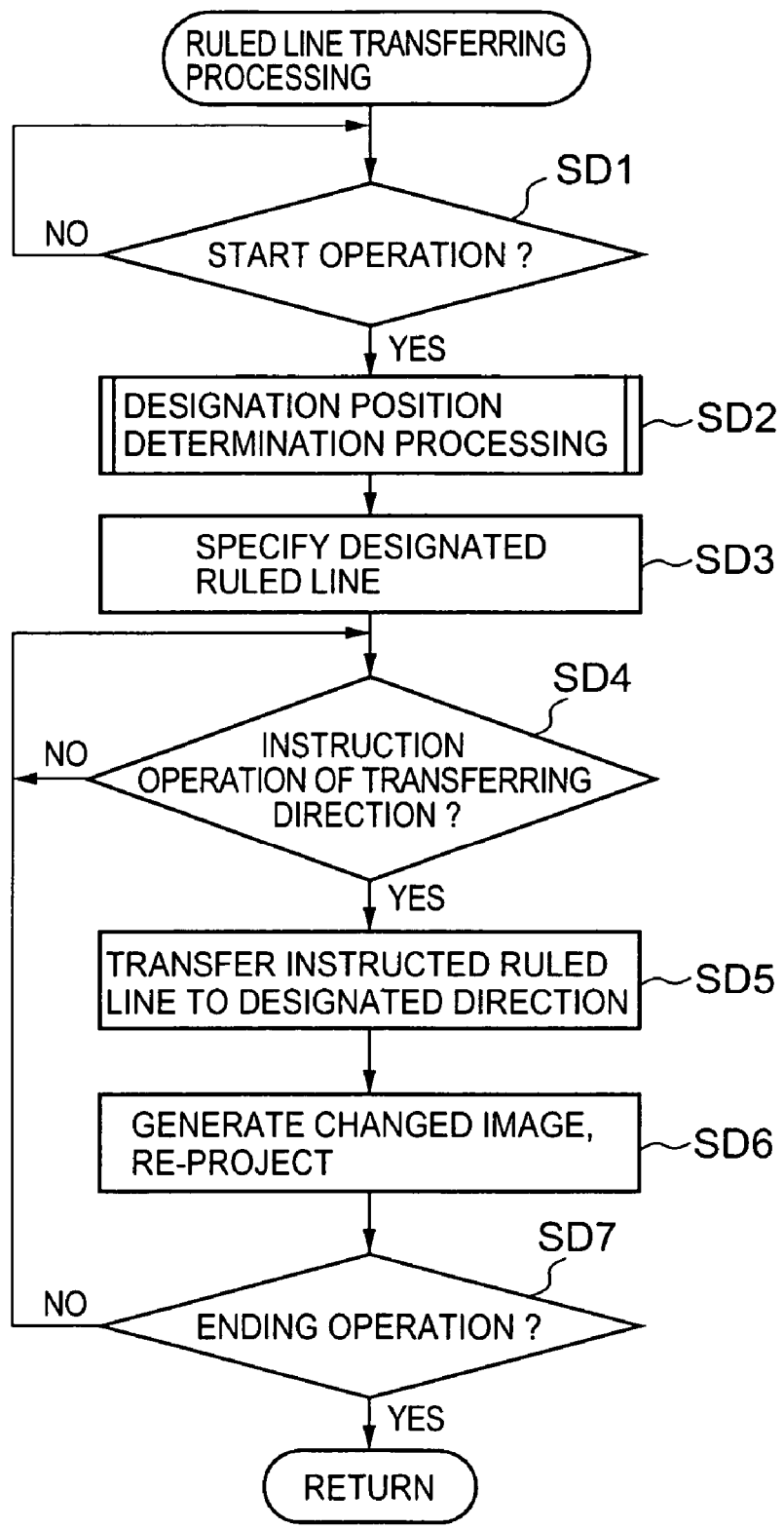
FIG. 11 is a flowchart showing content of ruled line transferring processing by the projector.

The CPU 2 specifies the ruled line designated by the spot light P, based n the coordinate that indicates the radiation position of the spot light P (Step D3 in FIG. 11).

The CPU 2 determines whether the operation button for instructing transferring direction is pressed or not, based on the operation information from he key input unit 7 (Step SD4).

In a case where it is determined that the operation button for instructing transferring direction is not pressed (Step SD4: NO), the CPU 2 waits until the operation button for instructing transferring direction is pressed.

In a case where it is determined that the operation button for instructing transferring direction is pressed, (Step SD4: YES), the CPU 2 transfers the designated ruled line to a designated direction, for a designated amount (Step SD5). Concretely, the CPU 2 changes coordinate data in the ruled line data 21*a*, shown in FIG. 9A, of the designated ruled line, based on the designated direction and amount.

The CPU 2 changes data corresponding to the cell data 21*b*, shown in FIG. 9B, in accordance with coordinate data in the ruled line data 21*a*, shown in FIG. 9A.

The CPU 2 generates a new template image, based on the changed data. The display unit 6 re-projects the generated template image to the screen S (Step SD6).

The CPU 2 determines whether the operation button for ending editing is pressed, based on the operation information from the key input unit 7 (Step SD7).

In a case where it is determined that the operation button for ending editing is not pressed (Step SD7: NO), the CPU 2 once again carries out processing of steps SD4 to SD6.

In a case where it is determined that the operation button for ending editing is pressed (Step SD7: YES), the CPU 2 ends the ruled line transferring processing.

Figure 13:
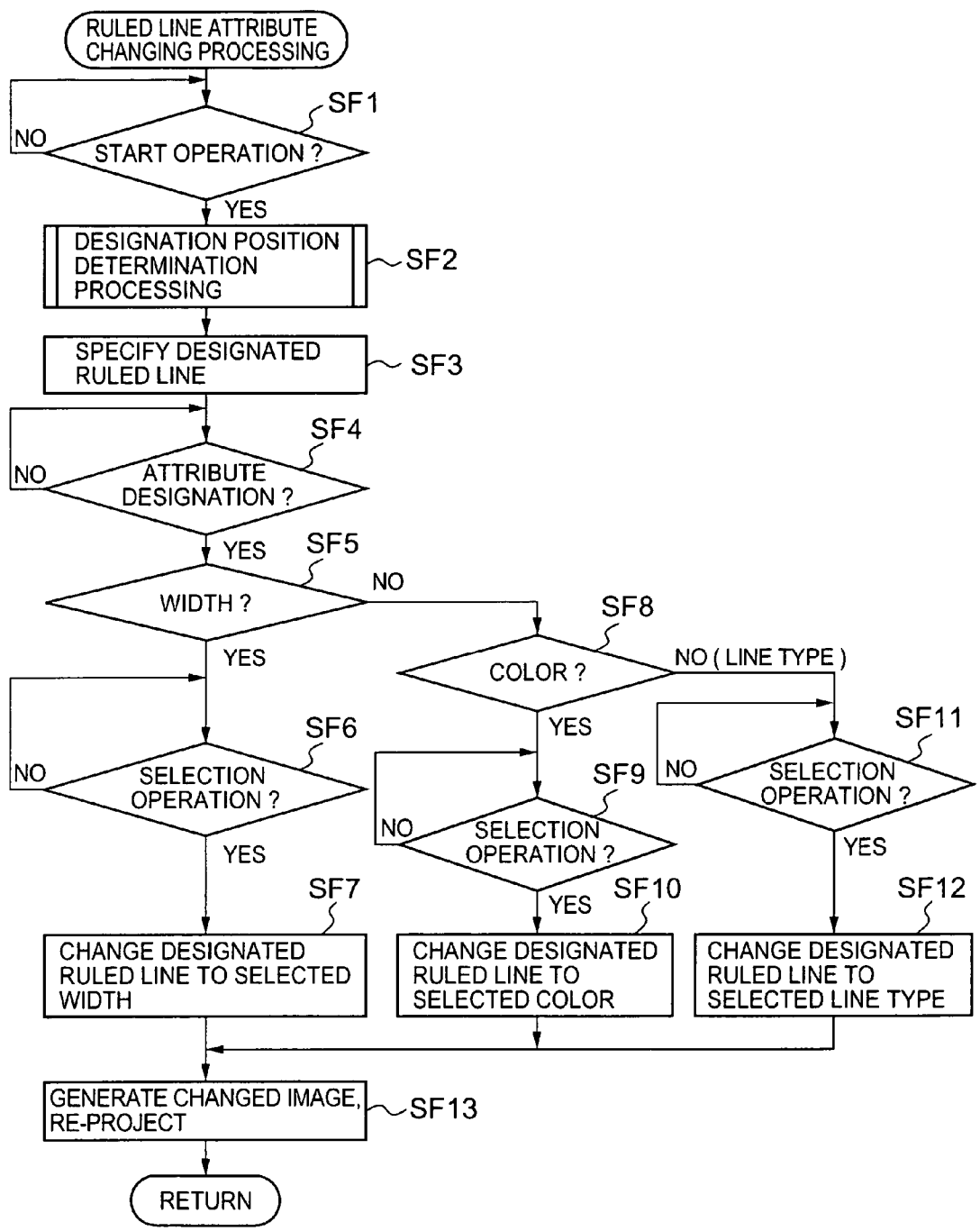
FIG. 13 is a flowchart showing content of ruled line attribute changing processing by the projector.

Next, ruled line attribute changing processing carried out by the projector 51, in step SC6 in FIG. 10, will be described with reference to the flowchart shown in FIG. 13.

The CPU 2 determines whether the operation button for starting editing is pressed or not, based on the operation information from the key input unit 7 (Step SF1).

In a case where it is determined that the operation button for starting editing is not pressed (Step SF1: NO), the CPU 2 waits until the operation button for starting editing is pressed.

In a case where it is determined that the operation button for starting editing is pressed (Step SF1: YES), the CPU 2 carries out designation position determination processing, according to the flowchart shown in FIG. 12 (Step SF2).

The CPU 2 specifies a ruled line designated by the user, based on a coordinate indicating the radiation position of the spot light P (Step SF3).

The CPU 2 determines whether attribute is designated or not, based on the operation information from the key input unit 7 (Step SF4).

If the operation button for attribute designation is not pressed, the CPU 2 determines that the attribute has not been designated yet (Step SF4: NO). In this case, the CPU 2 waits until the attribute is designated.

If the operation button for attribute designation is pressed, the CPU 2 determines that the attribute is designated (Step SF4: YES), and determines whether the attribute to be changed is "width" of ruled line or not, based on the operation information from the key input unit 7 (Step SF5).

If the operation button for designating "width" of ruled line, as the attribute to be changed, is pressed, the CPU 2 determines that instruction for changing "width" of ruled line is carried out (Step SF5: YES). In this case, the CPU 2 determines whether the operation button for selecting "width" of ruled line is pressed or not, based on the operation information from the key input unit 7 (Step SF6).

In a case where it is determined that the operation button for selecting "width" of ruled line has not been pressed (Step SF6: NO), the CPU 2 waits until the operation button for selecting "width" of ruled line is pressed.

In a case where it is determined that the operation button for selecting "width" of ruled line is selected (Step SF6: YES), the CPU 2 changes the designated ruled line width to a selected width (Step SF7). Concretely, the CPU 2 changes the width data of the designated ruled line in the ruled line data 21a shown in FIG. 9A.

In accordance with the change in width data of the ruled line data 21a shown in FIG. 9A, the CPU 2 changes data corresponding to the cell data 21b shown in FIG. 9B.

The CPU 2 generates a new template image, based on the changed ruled line data 21a. The display unit 6 re-projects the generated template image on the screen S (Step SF13).

Next, after the attribute is designated, in a case where it is determined that the operation button for selecting "width" of ruled line is not pressed (Step SF5: NO), the CPU 2 determines whether the attribute to be changed is color of ruled line or not, based on the operation information from the key input unit 7 (Step SF8).

In a case where it is determined that the operation button designating "color" of ruled line is pressed (Step SF8: YES), the CPU 2 determines that instructions for changing the "color" of ruled line is carried out, and determines whether the operation button for selecting "color" of ruled line is pressed or not (Step SF9). In a case where it is determined that the operation button for selecting "color" of ruled line is not pressed (Step SF9: NO), the CPU 2 waits until the operation button for selecting the "color" of ruled line is pressed.

In a case where it is determined that the operation button for selecting the "color" of ruled line is selected (Step SF9: YES), the CPU 2 changes the color of the designated color to a selected color (Step SF10). Concretely, the CPU 2 changes color data of the designated ruled line in the ruled line data 21a shown in FIG. 9A.

In accordance with the change of color data in the ruled line data 21a shown in FIG. 9A, the CPU 2 changes data that corresponds to cell data 21b shown in FIG. 9B.

The CPU 2 generates a new template image, based on the changed data. The display unit 6 re-projects the generated template image on the screen S (STEP SF13).

In a case where it is determined that the operation button for designating the "color" of ruled line is not pressed (Step SF8: NO), the CPU 2 determines that instructions for changing "line type" of line is carried out.

In this case, the CPU 2 determines whether the operation button for selecting "line type" of ruled line is pressed or not, based on the operation information from the key input unit 7 (Step SF11). In a case where it is determined that the operation button for selecting "line type" of ruled line is not pressed (Step SF11: NO), the CPU 2 waits until the operation button for selecting the "line type" of ruled line is pressed.

In a case where it is determined that the operation button for selecting "line type" is pressed (Step SF11: YES), The CPU 2 changes the line type of the designated ruled line to a selected line type (Step SF12). Concretely, the CPU 2 changes the line type data of the designated ruled line, in the ruled line data 21a shown in FIG. 9A.

In accordance with the change of line type data in the ruled line data 21a shown in FIG. 9A, the CPU 2 changes data that corresponds to the cell data 21b shown in FIG. 9B.

The CPU 2 generates a new template image, based on the changed data. The display unit 6 re-projects the generated template image on the screen S (Step SF13).

The CPU 2 ends the ruled line attribute changing processing, after the template image is re-projected on the screen S.

Figure 14:
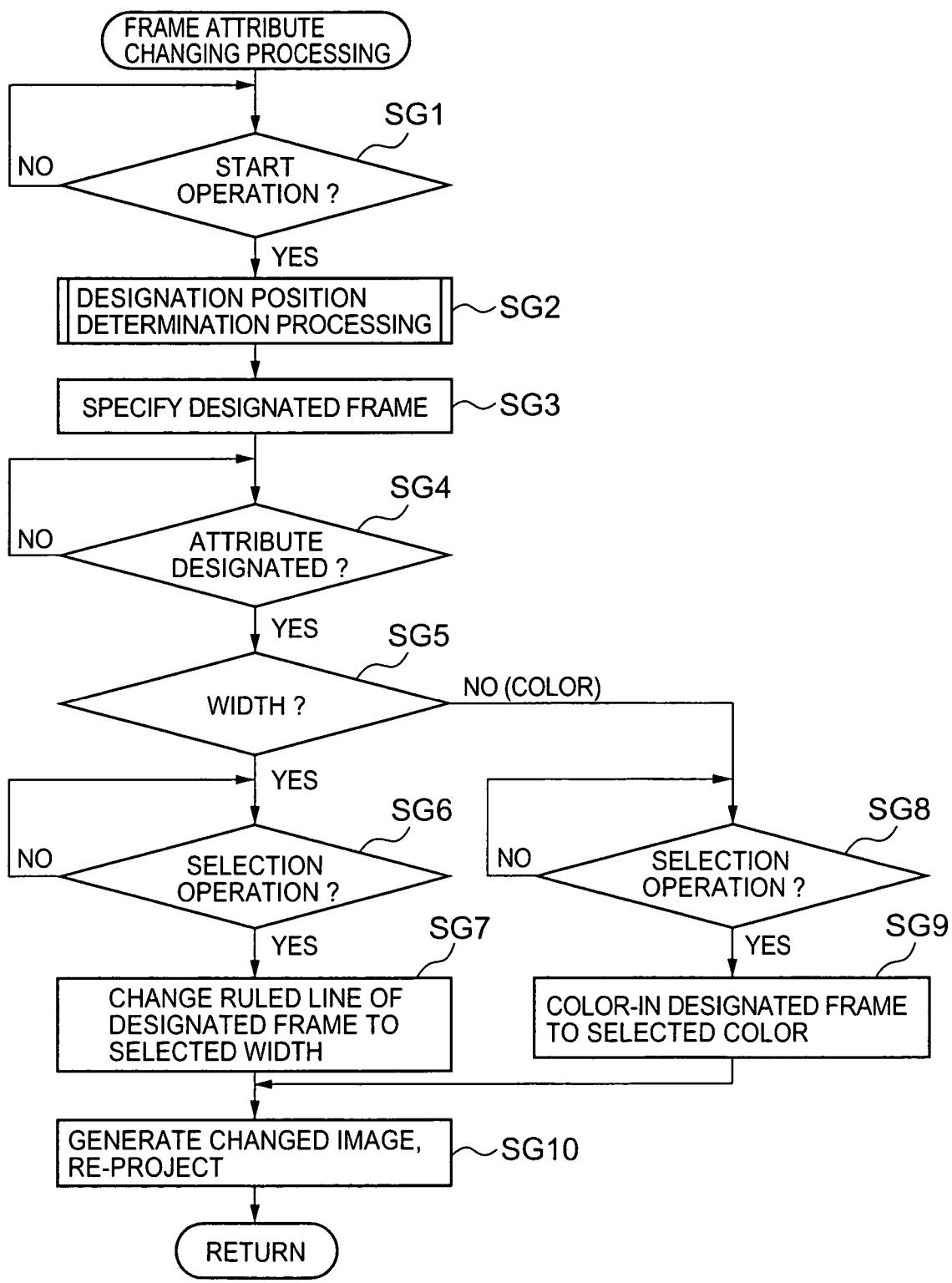
FIG. 14 is a flowchart showing content of frame attribute changing processing by the projector.

Next, frame attribute changing processing carried out by the projector 51, in Step SC8 in FIG. 10, will be described with reference to the flowchart shown in FIG. 14.

The CPU 2 determines whether the operation button for starting editing is pressed or not, based on the operation information from the key input unit 7 (Step SG1).

In a case where it is determined that the operation button for starting editing is not pressed (Step SG1: NO), the CPU 2 waits until the operation button for starting editing is pressed.

In a case where it is determined that the operation button for starting editing is pressed (Step SG1: YES), the CPU 2 carries out designation position determining processing, according to the flow chart shown in FIG. 12 (Step SG2).

The CPU 2 specifies a frame designated by the spot light P of the laser pointer 400, from the projected template image, based on the coordinate indicating the radiation position of the spot light P (Step SG3).

The CPU 2 determines whether the attribute to be changed is designated or not, based on the operation information from the key input unit 7 (STEP SG4).

If the operation button for attribute designation is not pressed, the CPU 2 determines that the attribute to be changed has not been designated yet (Step SG4: NO). In this case, the CPU 2 waits until the attribute is designated.

If the operation button for attribute designation is pressed, the CPU 2 determines that the attribute to be changed has been designated (Step SG4: YES). In this case, the CPU 2 determines whether instructions for changing "width" of the frame has been carried out or not (STEP SG5).

If the operation button for designating "width" of the frame is pressed, the CPU 2 determines that instructions for changing the "width" of the frame that forms the frame, has been carried out (Step SG5: YES). In this case, the CPU 2 determines whether the operation button for selecting "width" of ruled line is pressed or not (Step SG6).

In a case where it is determined that the operation button for selecting "width" of ruled line is not pressed (Step SG6: NO), the CPU 2 waits until the operation button for selecting "width" of ruled line is pressed.

In a case where it is determined that the operation button for selecting "width" of ruled line is pressed (Step SG6: YES), the CPU 2 changes the width of the ruled line that forms the designated frame to a selected width (Step SG7). Concretely, the CPU 2 changes the width data of the up, down, right, and left ruled line that form the designated frame, in the cell data 21b shown in FIG. 9B.

The CPU 2 generates a new template image, based on the changed data. The display unit 6 re-projects the generated template image to the screen S (Step SG10).

Next, after the operation button for attribute designation is pressed, in a case where it is determined that the operation button for designating "width" of frame is not pressed (Step SG8:YES), the CPU 2 determines that instructions for changing "color for coloring in" the frame is carried out. In this case, the CPU 2 determines whether the operation button for selecting the color for coloring in, is pressed or not (Step SG8).

In a case where the CPU 2 determines that the operation button for selecting the color for coloring in, is not pressed (Step SG8: NO), the CPU 2 waits until the operation button for selecting the color for coloring in, is pressed.

In a case where it is determined that the operation button for selecting the color for coloring in, is pressed (Step SG8: YES), the CPU 2 changes the color for coloring in, in the designate frame, to a selected color (step SG9). Concretely, the CPU 2 changes the color data of the designated frame, in the ruled line data 21b shown in FIG. 9B.

The CPU 2 generates a new template image based on the changed data. The display unit 6 re-projects the generated template image to the screen S (Step SG10).

The CPU 2 ends the frame attribute change processing, after re-projecting the generated template image to the screen S.

Figure 15:
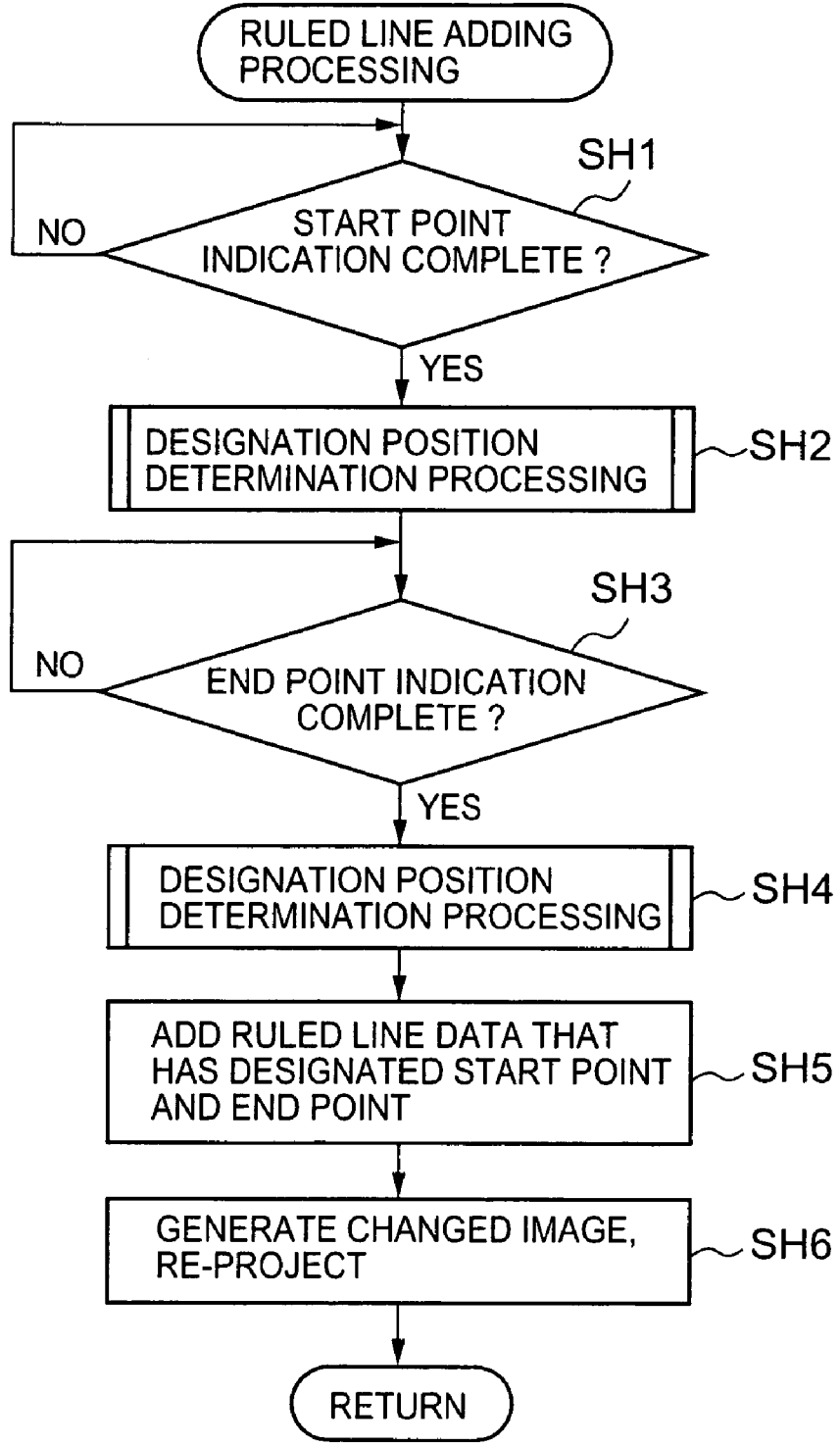
FIG. 15 is a flowchart showing content of ruled line adding processing by the projector.

Next, ruled line adding processing carried out by the projector 51, in step S9 of FIG. 10, will be described with reference to the flowchart shown in FIG. 15.

The CPU 2 determines whether start point instruction has been completed or not, based on the operation information from the key input unit 7 (Step SH1).

If the operation button for instructing the start point is not pressed, the CPU 2 determines that start point indication has not been completed (Step SH1: NO). In this case, the CPU 2 waits until the operation button for instructing the start point is pressed.

If the operation button instructing the start point is pressed, the CPU 2 determines that start point instruction is completed (Step SH1: YES). In this case, the CPU 2 carries out designation position determination processing, according to the flowchart shown in FIG. 12 (Step SH2). Then, the CPU 2 stores the obtained coordinate as the coordinate of the start point, to the RAM 4.

The CPU 2 determines whether endpoint instruction has been completed or not, based on the operation information from the key input unit 7 (Step SH3).

If the operation button for instructing endpoint is not pressed, the CPU 2 determines that endpoint instruction has not been completed (Step SH3: NO). In this case, the CPU 2 waits until the operation button for instructing endpoint is pressed.

If the operation button for instructing endpoint is pressed, the CPU 2 determines that endpoint instruction is completed (Step SH3: YES). In this case, the CPU 2 carries out designation position determination processing, according to the flowchart shown in FIG. 12 (Step SH4). The CPU 2 stores the obtained coordinate as the coordinate of the endpoint, to the RAM 4.

The CPU 2 adds new line data that includes the designated start point and endpoint to the ruled line data 21a of the projected template image (Step SH5). The CPU 2 adds new line data, also to the cell data 21b, in accordance with the addition of the ruled line data 21a.

The CPU 2 generates a new template image, based on the changed data. The display unit 6 re-projects the generated template image to the screen S (Step SH6).

The CPU 2 ends the ruled line adding processing, after re-projecting the template image to the screen S.

As described above, the projector 51 of the present embodiment can edit template images.

Therefore, in the same way as the first embodiment, an effect of saving time in creating charts is gained, and a requested template image can be easily obtained.

Template images are retained as the above described template data (ruled line data 21a and cell data 21b), and the template image is projected based on the template data. Therefore, memory capacity necessary for saving template images can be made smaller, and more template images can be stored.

Various embodiments are possible for carrying out the present invention, and is not limited to the above embodiments.

For example, in the first embodiment, the operation button for displaying a template corresponds to the template image. However, the key input unit 7 may comprise a switching button for switching template images, and the CPU 2 may switch template images, every time the switching button is pressed. By this kind of structure, selection of a requested template image can be carried out with fewer switching buttons.

In the second embodiment, processing of "ruled line transferring", "ruled line attribute changing", and "frame attribute changing" are described as the editing processing. However, the editing processing is not limited to these. For example, editing processing, such as erasing, etc., ruled lines may be carried out.

In the second embodiment, ruled lines and frames of the template image are selected one by one, to carry out various editing. However, ruled lines and frames selected as an editing target, is not limited to one. For example, by designating number of lines and number of rows, a plurality of ruled lines and frames can be designated. The entire template image may be selected, and the entire template image may be edited at once.

In the second embodiment, a case where template data for generating template image in a chart form is stored in the memory card 21 is described. However, template data for generating template images made of only horizontal ruled lines and longitudinal ruled lines, namely only ruled line data 21a may be stored in the memory card 21. The data may be stored in another recording medium, other than the memory card 21.

In the second embodiment, the laser pointer 400 is used for designating specific ruled lines and frames. However, an operation button may be used instead of the laser pointer 400, and a structure where ruled lines and frames are designated by an operation button, is possible. In this case, the projector 51 does not have to comprise the digital camera unit 8.

Editing processing may be carried out by various methods. For example, every time the operation button is pressed, ruled lines and frames that are editing choices may be switched. The switched ruled lines and frames may be expressed using color, and template images may be sequentially updated, and projected. Ruled lines and frames may be designated by an image such as a mouse pointer being displayed superposed on the template image, and moving it by an operation button which designates direction.

In the second embodiment, editing of an existing template image is described. However, a new template image may be generated, by comprising a structure that has the user designate a number of ruled lines and a number of rows, and width of the ruled line, without using the existing template image.

The projector 51 may store a storage button for designating storing to the memory card 21 of a newly created template image, after the template image is edited.

The second embodiment may be structured in the same way as the first embodiment, so that the projector 51 outputs the image data taken by the digital camera unit 8 to the PC 100, and the PC 100 stores the image data output from the projector 51 to the storing device 103.

The digital camera unit 8 in the first embodiment and the second embodiment, are not limited to being built-in to the projector 1 and 51, and a general purpose digital camera may be used. In this case, if the projector 1 and 51 and the digital camera comprise for example a USB communication interface, data communication can be carried out by a USB cable, and if the projector 1 and 51 and the digital camera comprise a radio communication interface, data communication by radio becomes possible.

The patent application claims the Paris Convention Priority based on Japanese Patent Application No. 2002-369133 filed with the Japan Patent Office on Dec. 20, 2002, the complete disclosure of which is hereby incorporated by reference.

The invention claimed is:

1. A projection device comprising:
a projection unit which projects an image on a screen based on image data provided to the projection unit;
a storing unit which stores template image generation data for generating template images that have predetermined content and a blank space to be filled in by a user;
a control unit which obtains the template image generation data for generating one of the template images from said storing unit, provides generated template image data based on the obtained data to said projection unit, and causes the projection unit to project the template image based on the template image data;
an imaging unit which captures an image of the screen; and
an image recording unit which stores an image captured by the imaging unit.

2. The projection device according to claim 1, wherein:
said storing unit stores pixel pattern information of said template images as said template image generation data; and
said control unit obtains the pixel pattern information from said storing unit, and generates said template image data, based on the obtained pixel pattern information.

3. The projection device according to claim 1, wherein:
said storing unit stores template data for drawing ruled lines and generating said template images, as said template image generation data, and
said control unit obtains said template data from said storing unit, and generates said template image data to have ruled lines drawn based on the obtained template data.

4. The projection device according to claim 3, comprising:
an indication unit which indicates an editing position in said template image projected on said screen, and
an input unit which inputs editing content of data that corresponds to said editing position, based on the obtained editing position,
wherein said control unit obtains information of the editing position indicated by said indication unit, specifies data corresponding to said editing position based on the obtained editing position, obtains the specified data from the storing unit, and edits the obtained data based on the editing content input by the input unit.

5. The projection device according to claim 4, wherein:
said storing unit stores ruled line data that defines ruled lines that are to be drawn, as said template data, and
said control unit specifies ruled line data that corresponds to said editing position, based on the obtained editing position information, and obtains the specified ruled line data from the storing unit.

6. The projection device according to claim 5, wherein:
said ruled line data stored by the storing unit includes ruled line attribute information that indicates an attribute of the ruled lines to be drawn, and
said control unit edits the ruled line attribute information for the specified ruled line data, based on the editing content input by said input unit.

7. The projection device according to claim 4, wherein:
said storing unit stores cell data that defines a cell that is surrounded by ruled lines that form said template images as said template data, and
said control unit specifies cell data that corresponds to said editing position, based on the obtained editing position information, and obtains the specified cell data from said storing unit.

8. The projection device according to claim 7, wherein:
said cell data stored by the storing unit includes cell attribute information indicating an attribute of cells, and
said control unit obtains cell attribute information for said specified cell data from said storing unit, edits the obtained cell attribute information, based on the editing content that said input unit input, and stores the edited cell data to said storing unit.

9. The projection device according to claim 4, wherein:
said indication unit radiates spot light to said screen, and
said control unit controls the imaging unit to carry out imaging of the screen where said template image is projected, and said spot light is radiated, obtains a position relationship of the spot light from said indication unit and said template image from the image captured by said imaging unit, and obtains editing position information of said template image based on the obtained position relationship.

10. A projection device comprising:
a projection unit which projects an image to a screen based on image data provided to the projection unit;
a storing unit which stores template image generation data for generating template images that have predetermined content and a blank space to be filled in by a user;
an imaging unit which captures an image of said screen;
a command reception unit which receives commands for controlling said projection unit and said imaging unit, and
a control unit which provides the template image generation data for generating one of the template images to said projection unit and causes said projection unit to project the template image to the screen, in accordance with a projection command received by said command reception unit, and controls said imaging unit to capture an image of said screen, in accordance with an imaging command received by said command reception unit.

11. A projection system comprising:
a projection device; and
an image storing device;
wherein said projecting device comprises:
a projection unit which projects an image on a screen based on image data provided to the projection unit;
a storing unit which stores template image generation data for generating template images that have a blank space to be filled in by a user;
an imaging unit which captures an image of said screen;
a sending unit which sends data; and
a control unit which provides the template image generation data for generating one of the template images to said projection unit and causes said projection unit to project the template image, which has a blank space to be filled in by a user, to the screen, and controls said imaging unit to capture an image of said screen; and wherein said image storing device comprises:

a storing unit which stores data of document images; and a control unit which extracts data of said document images from said storing unit, sends the extracted image data to the projection device to be projected to said screen, receives data of an image sent from the projection device, and stores data relating the received image data to data of said document image to said storing unit.

12. A method comprising:

storing data of a template image, which has a blank space to be filled in by a user, to be projected to a screen, beforehand;

extracting said stored data of the template image, projecting said template image, which has the blank space to be filled in by a user, to said screen, wherein the projected template image corresponds to the extracted data of the template image; and capturing an image of said screen where said template image is projected.

* * * * *